United States Patent
Arunachalam et al.

(10) Patent No.: US 12,341,855 B2
(45) Date of Patent: Jun. 24, 2025

(54) TESTING MEDIA TOPOLOGY FOR COLLABORATION SESSIONS

(71) Applicant: Cisco Technology, Inc., San Jose, CA (US)

(72) Inventors: Chidambaram Arunachalam, Apex, NC (US); Nagendra Kumar Nainar, Morrisville, NC (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/972,208

(22) Filed: Oct. 24, 2022

(65) Prior Publication Data

US 2024/0137420 A1    Apr. 25, 2024
US 2024/0236192 A9    Jul. 11, 2024

(51) Int. Cl.
*H04L 67/141* (2022.01)
*H04L 43/12* (2022.01)

(52) U.S. Cl.
CPC ............ *H04L 67/141* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 7,733,769 B1 * | 6/2010 | Jennings | H04L 43/12 709/224 |
| 7,990,889 B2 | 8/2011 | Beers et al. | |
| 9,571,358 B2 | 2/2017 | Satyanarayanan et al. | |
| 10,264,214 B1 | 4/2019 | Kumar | |
| 10,511,514 B1 * | 12/2019 | Vytla | H04L 43/0852 |
| 10,742,709 B2 | 8/2020 | Krishnaswamy et al. | |
| 10,965,725 B1 * | 3/2021 | Rosenberg | H04L 65/4038 |
| 2007/0245033 A1 * | 10/2007 | Gavrilescu | H04L 43/12 709/230 |
| 2014/0136718 A1 * | 5/2014 | Menezes | H04L 47/2441 709/227 |

(Continued)

OTHER PUBLICATIONS

"Advanced Diagnostics and Troubleshooting in Control Hub", online: https://help.webex.com/en-us/article/ni3wlvw/Advanced-diagnostics-and-troubleshooting-in-Control-Hub, Jul. 14, 2022, accessed Sep. 9, 2022, 41 pages.

(Continued)

*Primary Examiner* — Tonia L Dollinger
*Assistant Examiner* — Ishrat Rashid
(74) *Attorney, Agent, or Firm* — BEHMKE INNOVATION GROUP LLC; James M. Behmke

(57) ABSTRACT

In one embodiment, a device may obtain a media topology of nodes involved in a collaboration session. The device may cause each of a plurality of probes to be provisioned to a corresponding node of the nodes involved in the collaboration session to perform a test of a corresponding segment of the media topology, and each of the plurality of probes may be associated to a session identifier of the collaboration session. The device may determine observability information based on results of the plurality of probes for each segment of the media topology, and the results may include an indication of the session identifier. The device may correlate the observability information to the collaboration session based on the indication of the session identifier.

19 Claims, 10 Drawing Sheets

(56) References Cited

U.S. PATENT DOCUMENTS

| | | | |
|---|---|---|---|
| 2015/0341812 A1* | 11/2015 | Dion | H04N 21/6373 |
| | | | 370/252 |
| 2015/0358171 A1* | 12/2015 | Rosenberg | H04L 41/5054 |
| | | | 709/204 |
| 2016/0149753 A1* | 5/2016 | Gerszberg | H04B 10/25752 |
| | | | 370/242 |
| 2019/0222491 A1* | 7/2019 | Tomkins | H04L 41/0823 |
| 2021/0133670 A1* | 5/2021 | Cella | G06N 3/044 |
| 2021/0226870 A1* | 7/2021 | Giorcelli | H04L 43/20 |
| 2022/0070229 A1 | 3/2022 | Devaraj et al. | |
| 2023/0231762 A1* | 7/2023 | Wang | H04L 41/12 |
| | | | 709/224 |

OTHER PUBLICATIONS

Jones, et al., "End-to-End Identification in IP-Based Multimedia Communication Networks", Request for Comments 7989, Oct. 2016, 45 pages, IETF Trust.

WebEx Monitoring Tutorial—ThousandEyes Tutorial Series, online: https://www.thousandeyes.com/resources/webex-monitoring-tutorial, 8 pages, Cisco Systems, Inc.

* cited by examiner

| PROBE IDENTIFIER | SOURCE NODE | DESTINATION NODE | TRAFFIC PROFILE | ASSOCIATED SESSION IDENTIFIER |
|---|---|---|---|---|
| 1 | 402a | 404a | Audio-1 | 123456789 |
| 2 | 404a | 402a | Audio-1 | 123456789 |
| 3 | 404a | 404c | Audio-1 | 123456789<br>123456790<br>123456791 |
| 4 | 404c | 404a | Audio-1 | 123456789<br>123456790<br>123456791 |
| 5 | 402c | 404b | Audio-2 | 123456789 |
| 6 | 404b | 402c | Audio-2 | 123456789 |
| 7 | 402b | 404b | Audio-1 | 123456789 |
| 8 | 404b | 402b | Audio-1 | 123456789 |
| 9 | 404b | 404c | Audio-1 | 123456789<br>123456790<br>123456791 |
| 10 | 404c | 404b | Audio-1 | 123456789<br>123456790<br>123456791 |
| 11 | 402d | 404c | Audio-1 | 123456789 |
| 12 | 404c | 402d | Audio-1 | 123456789 |

FIG. 6A

| PROBE IDENTIFIER | SOURCE NODE | DESTINATION NODE | TRAFFIC PROFILE | ASSOCIATED SESSION IDENTIFIER |
|---|---|---|---|---|
| 13 | 402a | 404a | Video-1 | 123456789 |
| 14 | 404a | 402a | Video-1 | 123456789 |
| 15 | 404a | 404c | Video-1 | 123456789<br>123456790<br>123456791 |
| 16 | 404c | 404a | Video-1 | 123456789<br>123456790<br>123456791 |
| 17 | 402c | 404b | Video-2 | 123456789 |
| 18 | 404b | 402c | Video-2 | 123456789 |
| 19 | 402b | 404b | Video-1 | 123456789 |
| 20 | 404b | 402b | Video-1 | 123456789 |
| 21 | 404b | 404c | Video-1 | 123456789<br>123456790<br>123456791 |
| 22 | 404c | 404b | Video-1 | 123456789<br>123456790<br>123456791 |
| 23 | 402d | 404c | Audio-1 | 123456789 |

FIG. 6B

TESTING MEDIA TOPOLOGY FOR COLLABORATION SESSIONS

TECHNICAL FIELD

The present disclosure relates generally to computer systems, and, more particularly, to testing media topology for collaboration sessions.

BACKGROUND

Unified communication (UC) networks are now ubiquitous across all types of businesses. UC networks support the integration of a range of enterprise communication services that can be used to optimize business processes and increase user productivity. For examples, UC networks are often relied upon to support collaboration sessions (e.g., virtual meetings, video conferencing, cloud calling, screen sharing, messaging, etc.) between users.

Troubleshooting audio quality, video quality, and other technical problems in UC networks can be one of the most complex and time-consuming problems for support engineers, customers, and product engineers to address. Increasingly, UC networks are relied upon to facilitate collaboration sessions across geographically distributed is enterprise campuses and remote work locations. The move to this hybrid work environment and the significant migration from on-premises to cloud-hosted collaboration sessions has exacerbated the problem even further. Presently, there is insufficient visibility to troubleshoot and/or isolate network problems across geographically distributed nodes participating in a collaboration session.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6B illustrate example probe mappings for testing media topologies of collaboration sessions;

DESCRIPTION OF EXAMPLE EMBODIMENTS

Overview

According to one or more embodiments of the disclosure, a device may obtain a media topology of nodes involved in a collaboration session. The device may cause each of a plurality of probes to be provisioned to a corresponding node of the nodes involved in the collaboration session to perform a test of a corresponding segment of the media topology, and each of the plurality of probes may be associated to a session identifier of the collaboration session. The device may determine observability information based on results of the plurality of probes for each segment of the media topology, and the results may include an indication of the session identifier. The device may correlate the observability information to the collaboration session based on the indication of the session identifier.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes is over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
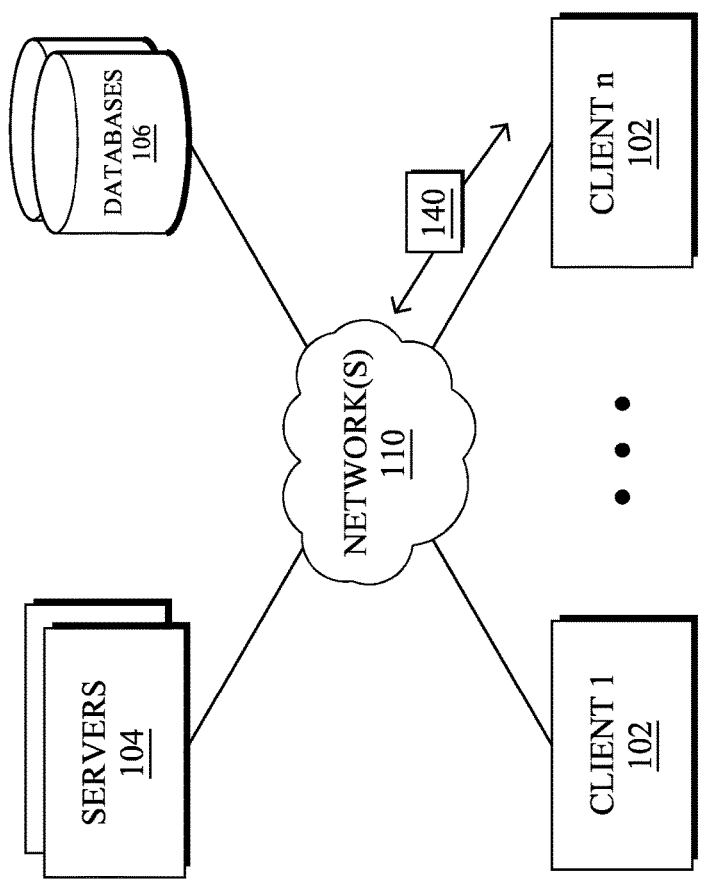
FIG. 1 illustrates an example simplified computing system.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and is databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
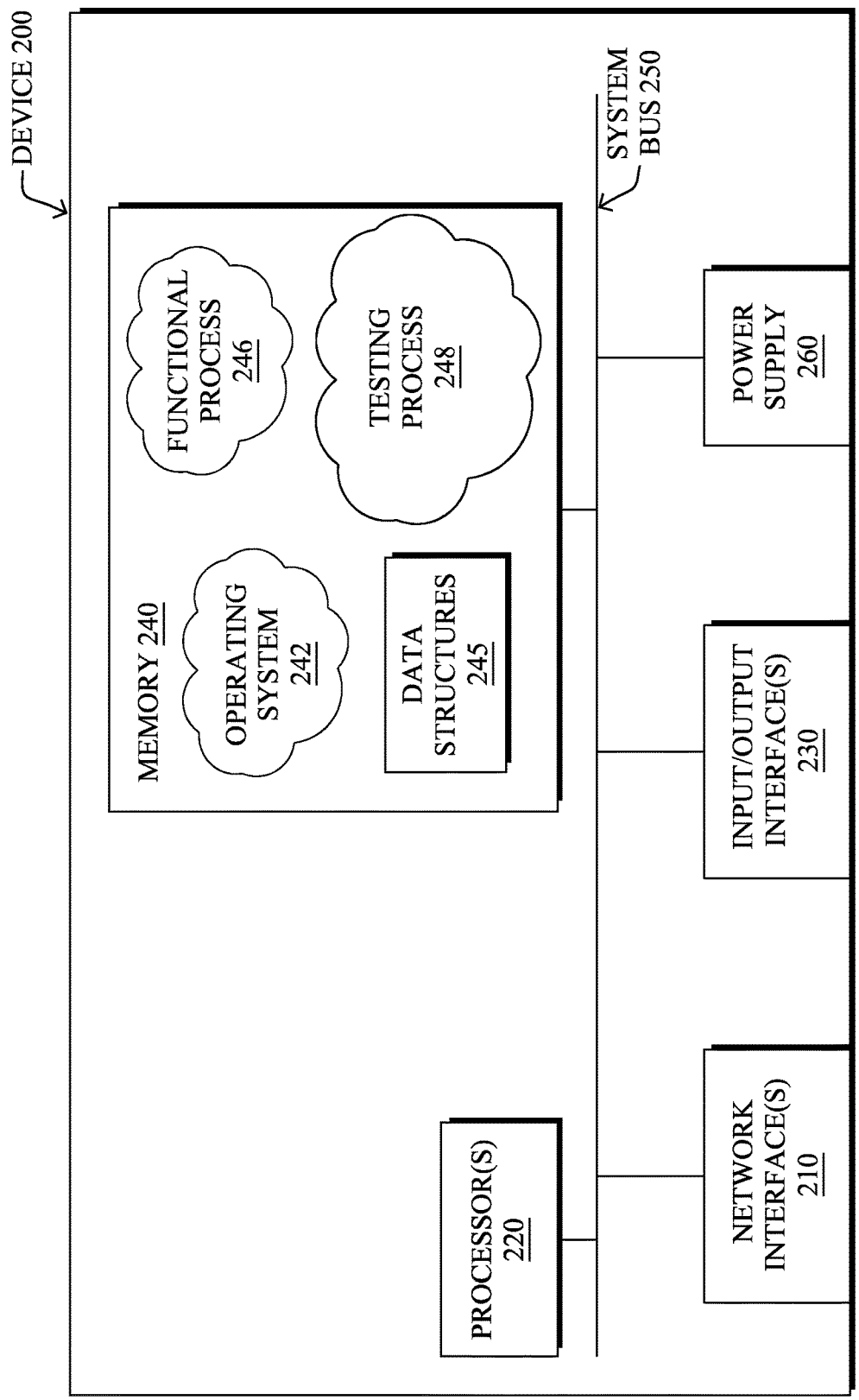
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are is typically resident in memory 240 and executed by the processor, functionally organizes the device by, among other things, invoking operations in support of software processes and/or services executing on the device. These software processes and/or services may comprise a one or more functional processes 246, and on certain devices, an illustrative "testing" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Collaboration Session Environments

As noted above, enterprise communication services have become an integral part of efficiently accomplishing business processes for enterprises. Enterprise communication services can include instant messaging, virtual meetings, presence information, voice communication medias (e.g., cloud-based calling, internet protocol telephony, etc.), real-time audio/video/web conferencing, desktop sharing, data sharing, etc.

Users of the enterprise communication services may participate in collaboration sessions provided by the enterprise communication services. For example, users may participate in a collaboration session such as a virtual meeting including video conferencing, cloud calling, screen sharing, messaging, etc. components facilitate by the enterprise communication service. For example, the virtual meetings may be conducted using a virtual meeting application provided by the enterprise communication service. In some instances, the virtual meeting application may be at least partially cloud based.

The collaboration sessions may be supported by a data network (e.g., a UC network, etc.) which facilitates communication between participants' devices. Specifically, as discussed with respect to illustrative FIG. 3 below, users can participate in an enterprise communication service collaboration session involving distributed nodes and/or cloud-based enterprise communication service resources networked together in a media topology.

Figure 3:
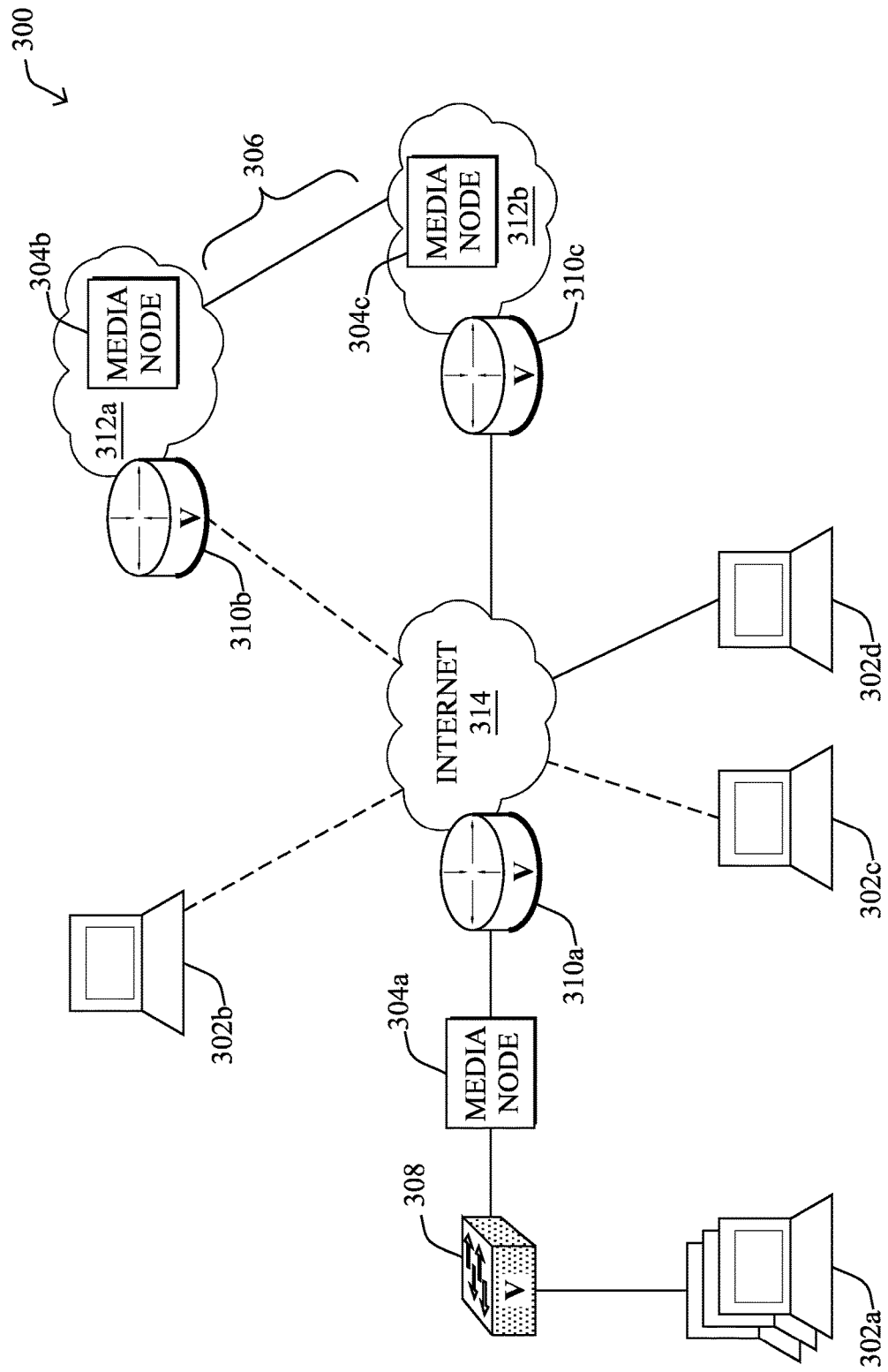
FIG. 3 illustrates an environment for conducting a collaboration session.

FIG. 3 illustrates an environment 300 for conducting a collaboration session between distributed client devices 302. For example, environment 300 may support a collaboration session such as a virtual meeting with global participants attending via distributed client devices 302. In such examples, multiple media nodes 304 within the cloud may be used to deliver the meeting experience to client devices 302. These media nodes 304 can be co-located or geographically distributed from one another with cascade links (e.g., cascade link 306 between media node 304b and media node 304c, a cascade link between media node 304a and media node 304c, etc.) setup between them for the duration of the collaboration session.

Client devices 302 may include network connected computing devices. In some examples, client devices 302 may include a computer, a smart device, an IOT device, a dedicated video conferencing device, a collaboration session peripheral device, a smartphone, etc. As previously mentioned, client devices 302 may be geographically distributed across different geographic sites.

For example, some client devices (e.g., client device 302a) may be located at a first geographic site. The first geographic site may be a main office, main campus, corporate headquarters, etc. As such, the client devices at the first geographic site may be is connected to data network of the first geographic site (e.g., a main office network, main campus network, corporate headquarters network, etc.). For example, these client devices may be communicatively coupled to the network through a switch 308. In some examples, switch 308 may be a workgroup-switch (e.g., a switch that serves the needs of a group of workers who generally are geographically clustered in a local area network (LAN)).

The switch 308 may be communicatively coupled to and/or facilitate data provision to a first media node (e.g., media node 304a). The first media node may be a meeting server that offers an on-premises conferencing utility for the first geographic site. The first media node may provide audio, video, and web communication that optimizes bandwidth usage for the collaboration session. For example, the first media node may facilitate an optimized participation of the collaboration endpoints, such as the client devices at the first geographic sites, in a collaboration session over a network such as the internet 314. In some examples, the first media node may operate as a video mesh. A video mesh may provide local media processing that improves the quality of audio, video, and data sharing and reduces internet bandwidth consumption and may also provide a management system across all meeting deployments with cloud-based provisioning, usage metrics, and automated delivery of software updates.

The first media node may handle data communication for a collaboration session occurring over internet 314. Internet 314 may be accessed via a first edge device (e.g., edge device 310a). The first edge device may be a router. The router may be configured to provide a single or distributed infrastructure carrying data, voice, and video over packet networks. In some examples, the router may be deployed as a voice gateway router that provides advanced IP routing services combined with voice media gateway functions (e.g., supports a wide range of packet telephony-based voice interfaces and signaling protocols, supports hundreds voice channels, etc.).

Other client devices participating in the collaboration session may be located at other geographic sites. For example, they may be located at branch offices, home offices, other campuses, mobile locations, etc. In some examples, a second client device(s) is (client device 302b) may be participating in the collaboration session from a second geographic site, a third client device(s) (e.g., client device 302c) may be participating in the collaboration session from a third geographic site, a fourth client device(s) (e.g., client device 302d) may be participating in the collaboration session from a fourth geographic site, and so on. The client devices 302 may participate in the collaboration session via their respective connections to internet 314.

In various embodiments, the other client devices may access the collaboration session via their assigned respective media nodes 304. For example, media streams for the collaboration session for the second and third client device(s) may be handled by a second media node (e.g., media node 304b), which may be a cloud-based media node. Meanwhile, media streams for the collaboration session for the fourth client device(s) may be handled by a third media node (e.g., media node 304c), which may also be a cloud-based media node. Of course, selection of the particular media node handling a client device's media streams for the collaboration session may be dynamic and depend on various factors such as a number of active sessions, performance, quality of the network connectivity between the client device and the media node, etc. The second and third media nodes may, as noted, be located in a computing cloud 312 (e.g., computing cloud 312a, computing cloud 312b) and/or be reachable via respective edge devices 310 (e.g., edge device 310b, edge device 310c). In some examples, cascade links may be set up between the media nodes 304.

Client devices 302 may utilize the components of environment 300 to participate in a collaboration session. The components may facilitate the efficient communication of collaboration session data such as data, voice, video, etc. over internet 314 and/or other networks. In various embodiments, the collaboration session may be identified by a session identifier (e.g., a meeting identifier, a session identifier for a cloud-based calling session, etc.). The session identifier may uniquely identify the particular collaboration session among other collaboration sessions that may utilize all or parts of the same components of environment 300, involve all or some of the same client devices 302, etc. The client devices 302 participating in the particular collaboration session may identify is and/or access that collaboration session utilizing its unique collaboration session identifier. In some instances, the collaboration session identifier may be used as a credential to access the collaboration session. Once participating in the collaboration session, the client device 302 may begin to transmit and/or receive the collaboration session data.

In some instances, technical problems may arise during the collaboration session. These technical problems may be perceived by the user of client devices 302 as degraded audio/video quality, audio/video interruptions, audio/video artifacts, connection interruptions, errors, degraded functionality, etc. Essentially, these technical problems may hamper the ability of a user to collaborate in a collaboration session and/or degrade the user experience. Given that this undermines the very purpose of the collaboration session, the ability to rapidly troubleshoot these technical problems in way that provides a prompt and effective resolution may be essential to user satisfaction and wide-scale product adoption.

As noted above, troubleshooting technical problems within collaboration sessions can be complex and time-consuming. In recent years, customers have started to use observability products and/or agents within their network to isolate network segments in which impairments such packet loss, jitter, delay etc. are introduced. Recently Cloud Collaboration service providers are also starting to install observability products within their network.

However, most of the testing performed by observability agents are pre-configured test cases and may not include all the right media devices participating in a given collaboration session. For example, as described above a collaboration session with global participants may use multiple media nodes within the cloud to deliver the meeting experience. As previously mentioned, these media nodes can be co-located or geographically distributed with cascade links setup between for the duration of the meeting. However, the observability agents running on a customer site do not have visibility into such cascade links and hence ability for the customer to troubleshoot and is isolate is very limited.

As a result, many customers may end up opening support cases engaging support engineers in resolving the problem. However, support engineers are engaged after the problem has already happened and they must primarily rely on logs which aren't that useful for isolating network issues. Presently, these support engineers lack access to granular packet flow statistics captured at network hops to correctly isolate the issues.

Testing Media Topology for Collaboration Sessions

The techniques herein introduce mechanisms to provide visibility across the entire network to facilitate rapid technical problem diagnosis and recovery. For example, the techniques herein introduce mechanisms by which a collaboration session controller component within a collaboration service provider dynamically initiates testing at several observability agents at both customer premises and within the cloud including across the cascade links during a live collaboration session. This testing is performed based on awareness of the topology of the media nodes and endpoints engaged in a collaboration session. Collaboration session identifiers (e.g., meeting identifier, session identifier of a cloud-based calling session, etc.) may be used in these techniques as correlation ID to correlate test probe results from multiple observability agents and to provide an end-to-end view of testing results.

Illustratively, the techniques described herein may be performed by hardware, software, and/or firmware, such as in accordance with testing process 248, which may include computer executable instructions executed by the processor 220 (or independent processor of interfaces 210) to perform functions relating to the techniques described herein, e.g., in conjunction with corresponding processes of other devices in the computer network as described herein (e.g., on network agents, controllers, computing devices, servers, media nodes, etc.). In addition, the components herein may be implemented on a singular device or in a distributed manner, in which case the combination of executing devices can be viewed as their own singular "device" for purposes of executing the is testing process 248.

Operationally and according to various embodiments, the techniques herein provide consolidated end-to-end understandings of collaboration session media topologies which can be used to help support engineers to accelerate network isolation process, identify the network segments of interest accurately, troubleshoot the specific network or media nodes quickly, solve the problem and provide strong evidence in their root cause analysis to customers.

Figure 4:
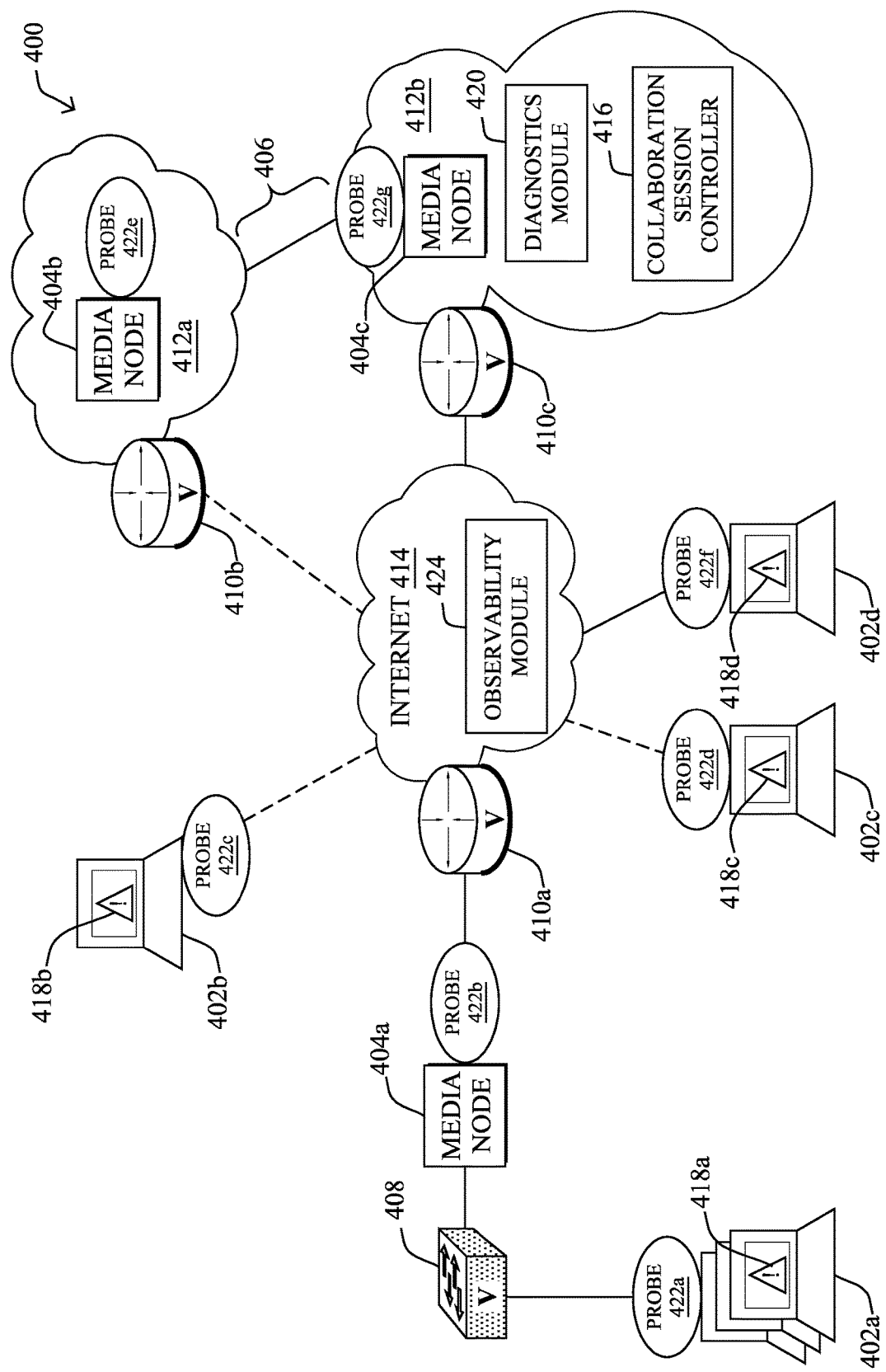
FIG. 4 illustrates an example architecture for testing media topologies of collaboration sessions.

Specifically, FIG. 4 illustrates an example architecture 400 for testing media topologies of collaboration sessions, according to various embodiments. Architecture 400 may include client devices 402 participating in a collaboration session similar to that depicted in FIG. 3. For example, the client devices 402 may be located in different geographic regions. Some client devices (e.g., client device 402a) may be located in a first geographic site such as a main office, main campus, corporate headquarters, etc. and may participate in a collaboration session across the internet 414 by transmitting data utilizing data communication via a switch 408 and/or a first edge device (e.g., edge device 410a). Other client devices (e.g., client device 402b, client device 402c, client device 402d) may be located in different geographic sites and may participate in the same collaboration session via their connections to internet 414.

Media nodes 404 may handle communication of the collaboration session data for the collaboration session. For example, a first media node (e.g., media node 404a) may handle collaboration session data communication for the first client devices (e.g., client device 402a), a second media node (e.g., media node 404b) may handle collaboration session data communication for the second and third client devices (e.g., client device 402b and client device 402c), and a third media node (e.g., media node 404c) may handle collaboration session data communication for the fourth client device (e.g., client device 402d). Cascade links, such as the cascade link between media node 404a and 404c, may be established between the media nodes 404 to optimize upstream bandwidth utilization by aggregating media streams into the cascade links.

In an example scenario, while participating in a collaboration session, the client is devices 402 may experience a technical problem 418. For example, client devices 402 may experience a packet loss problem manifesting as degraded audio, video, etc. on the participating client devices. In an example scenario, all client devices 402 participating in the collaboration session are experiencing the packet loss problem. Users and/or support staff at the local sites of client devices 402 may be unable to identify a source of the technical problem 418 (e.g., the source of the packet loss) at their site. The users and/or support staff may engage a cloud-based collaboration session provider's support team to identify and/or resolve the source of the problem for the collaboration session.

Previously, a support engineer addressing the problem may analyze client statistics provided from the client devices 402. The support engineer may determine from the client statistics that media flows (e.g., collaboration session data communications) originating from a collaboration session provider's cloud (e.g., cloud 412b) and being communicated to the client devices 402 are experiencing packet loss. However, with only this information the engineer would be unable to isolate whether this packet loss is cause by the internet service provider, by a network in which a media node 404 resides (e.g., cloud 412a where media node 404b resides, cloud 412b where media node 404c resides, etc.), by the media node 404 applications themselves, etc. Previously, a support engineer would not have knowledge of a media topology of the collaboration session and/or would not have access to the network or application infrastructure within the collaboration session provider's cloud and would have to engage a cloud network operations team to achieve network visibility with manual coordination and time.

In contrast, embodiments of the present disclosure may include mechanisms for isolating, identifying, and resolving technical problems within a collaboration session by determining the media topology of the collaboration session, dynamically provisioning observability test probes, and correlating test results from the probes to the collaboration session. In various embodiments, these mechanisms may be triggered responsive to various events.

For example, client devices 402 may send their transmit and receive media stream statistics to a collaboration session provider's cloud (e.g., cloud 412b) as telemetry data. A media analytics component (e.g., of the collaboration session provider's cloud) may detect indications of network impairments among these statistics. Once these impairments meet or exceed an impairment threshold, the media analytics component may inform a diagnostics module 420 of the collaboration session provider's cloud to trigger the technical problem identifying and/or resolving mechanisms descried herein. In some instances, the support engineers may initiate diagnostics module 420 themselves for a specific collaboration session based on an issue being reported by and/or received from a customer and/or client device 402 participating in that collaboration session.

Diagnostics module 420 may be located at and/or executed by a processing resource of a collaboration session provider. In some examples, diagnostics module 420 may operate within a cloud of a cloud-based collaboration session (e.g., cloud 412b). In some examples, diagnostics module 420 may be located at and/or executed by a processing resource of another cloud, another location connected to internet 414, a client-side network, etc.

Diagnostics module 420 may discover a media topology of nodes (e.g., client devices 402, media nodes 404, etc.) involved in a collaboration session. Diagnostics module 420 may discover the media topology by obtaining (e.g., fetching, constructing, calculating, etc.) a model or diagram of the network and/or components participating in the collaboration session. For example, diagnostics module 420 may determine where each of the nodes involved in the collaboration session is located and/or how they are interconnected. Further, diagnostics module 420 may determine how data flows within the network and/or between each of the nodes participating in the collaboration session. Therefore, diagnostics module 420 may obtain an understanding of how the nodes communicate with each other and/or how media streams of the collaboration session flow between the nodes. Further, diagnostics module 420 may obtain a type of data traffic (voice, video, audio, etc.) in a media stream communicated between each of the nodes involved in the collaboration session. As such, diagnostics module 420 may obtain an extensive understanding of the media topology of a collaboration session ranging from is the client devices 402 participating in the collaboration session, the media nodes 404 involved in the collaboration session, and/or the communication of media streams among those components for the collaboration session.

In various embodiments, diagnostics module 420 may obtain the media topology for a collaboration session from a collaboration session controller 416. Collaboration session controller 416 can be co-located with diagnostics module 420 and/or be located in and/or executed from a different location that is communicatively coupled to diagnostics module 420. Collaboration session controller 416 may include a controller for delivering, monitoring, managing, securing, and/or configuring a collaboration session. For example, a collaboration session controller 416 may include a meeting controller for a virtual meeting.

In addition to the above-outlined mapping of the nodes and/or data communications involved in the collaboration session, diagnostics module 420 may obtain observability capabilities and/or a state for each of the nodes involved in the collaboration session. For example, as part of the same request-response exchange for the media topology, diagnostics module 420 may obtain an indication of the observability capabilities and/or state for each client device and/or media node. The observability capabilities and/or state may include whether an observability agent (e.g., capable of carrying out media topology testing) is present on each of the nodes, a current load of the observability agent on each node, a current test case or probe assigned to each node, etc. These observability capabilities and/or state may, as previously mentioned, be obtained from the collaboration session controller, which may itself obtain the knowledge from each node during a collaboration session setup process augmented to carry additional attributes of the observability agent and/or its state.

Diagnostics module 420 may, upon obtaining the media topology for a collaboration session, transition to testing to isolate a potential source of the technical problem 418 being experienced by the client devices 402 of the collaboration session. For example, diagnostics module 420 may devise a probing strategy to test each segment of the media topology of a collaboration session for a source of the technical problem 418. The probing strategy may include identifying probes 422 (e.g., data probes, test cases, etc.) to be provisioned to each node for testing of a respective segment of the obtained media topology. A segment of the media topology may be a portion of the media topology between two nodes involved in the collaboration session. Each probe may be configured to test a segment of the media topology between its assigned source node and a destination node.

Diagnostics module 420 may generate a probe provisioning request. The probe provisioning request may be a bulk probe provisioning request that, when fulfilled, will cause each of the probes 422 (e.g., probe 422a-probe 422g) identified its probing strategy to be provisioned at their respective source node. The probe provisioning request may include a list of the probes 422 to be provisioned for the collaboration session. The probe provisioning request may specify a source node for each probe and a destination node for each probe. The source node and destination node for each probe may be identified by the diagnostics module 420 based on the obtained media topology.

The probe provisioning request may also specify a traffic profile for each probe to be provisioned. The traffic profile may be the type of data traffic (e.g., audio, video, text, etc.) which should be used for the probe. The traffic profile of each probe may be identified by the diagnostics module from the type of data traffic of each of the media streams as identified in the media topology.

Each of the probes 422 included in the probe provisioning request may be associated with a session identifier (e.g., a meeting identifier, a session identifier for a cloud-based calling session, etc.) for the particular collaboration session being analyzed. For example, the collaboration session may be a virtual meeting and, in such examples, each of the probes used to identify the source of a technical problem for that meeting may be associated to the meeting identifier for that virtual meeting. The probe provisioning request may specify the session identifier associated to each of the probes 422 included in the request.

Diagnostics module 420 may provide the provisioning request to observability is module 424. Observability module 424 may be located on and/or executed from a server or other computing component configured to provision observability test probes and/or gather their results. Observability module 424 may be co-located with diagnostics module 420 and/or collaboration session controller 416 and/or be located in and/or executed from a different location that is communicatively coupled to diagnostics module 420. In various embodiments, observability module 424 may be located in a completely separate cloud location and/or platform (e.g., a network infrastructure monitoring platform, etc.)

Observability module 424 may accept the provisioning request from diagnostics module 420. Observability module 424 may assign a job identifier to the provisioning request and start the probe provisioning process according to the probe provisioning request. Observability module 424 may assign a probe identifier to each of the probes 422. Each probe identifier may be associated to the session identifier associated to the probe it is identifying. Observability module 424 may cause probes 422 to be provisioned by sending a corresponding provisioning request to each of the client devices 402 and/or media nodes 404 identified in the provisioning request.

Each client device and/or media node receiving a provisioning request for a specific probe may generate the specified probe and cause the probe test to be performed. Performing the probe test may include communicating the probe across the segment of the media topology identified in the provisioning request (e.g., the span of the media topology between the source node and the destination node) and collecting and/or communicating the telemetry data for that probe communication. In various embodiments, an observability agent (e.g., as identified in the observability capabilities obtained above) at each of the media nodes 404 and/or client devices 402 may receive a corresponding specific probe provisioning request, perform the probe testing for that specific probe, and collect and/or communicate the telemetry data collected from communicating that specific probe across a corresponding segment of the media topology.

The telemetry data (e.g., probe results) from each probe test may be communicated back to observability module 424. The telemetry data may carry an indication (e.g., a tag) of the probe identifier and/or the collaboration session identifier that were assigned to the probe from which the telemetry data was generated. Therefore, the probe identifier and the collaboration session identifier associated with a probe may be determined by analyzing the tagged telemetry data from that probe. As such, observability module 424 may use the collaboration session identifier (specified in the provisioning request and in the telemetry data) as a correlation identifier to correlate and/or aggregate all of the telemetry data from all the probes associated with the collaboration session identifier. Therefore, the telemetry data collected across all the hops and/or segments of the media topology for a collaboration session may be accumulated to provide end-to-end visibility of the media topology for the collaboration session.

Observability module 424 may provide the aggregated telemetry data for a particular collaboration session to diagnostics module 420. Diagnostics module 420 may use the telemetry data from each of the probes 422 to generate a diagnostic assessment of the media topology for a collaboration session. The diagnostic assessment may include individual assessments of the performance of each segment of the media topology for the collaboration session pieced together from the corresponding probe test results for each segment. In various embodiments, the diagnostic assessment may be an end-to-end, correlated, and consolidated view of statistics at each major hop through which media streams flow in a collaboration session. For example, the diagnostic assessment may provide indications of the performance of each segment of the media topology overlaid on top of a graphical illustration of the media topology.

Since the performance of each segment of the media topology can be assessed with this technique, the diagnostic assessment may be used to identify and/or isolate the technical problem 418 to a specific segment within the media topology. A support engineer may utilize the diagnostic assessment to rapidly identify the source segment of technical problem 418, troubleshoot that specific segment and/or media nodes within that segment, and/or share root cause analysis with a customer. Although some of the examples are stated in terms of a virtual meeting, it should be appreciated that these techniques are applicable to any type of collaboration session. For example, the techniques may be utilized with cloud-based calling in which observability agents may be run in media resources (e.g., media termination points, transcoders, etc.), session border controllers, gateways, and/or collaboration endpoints.

Figure 5A:
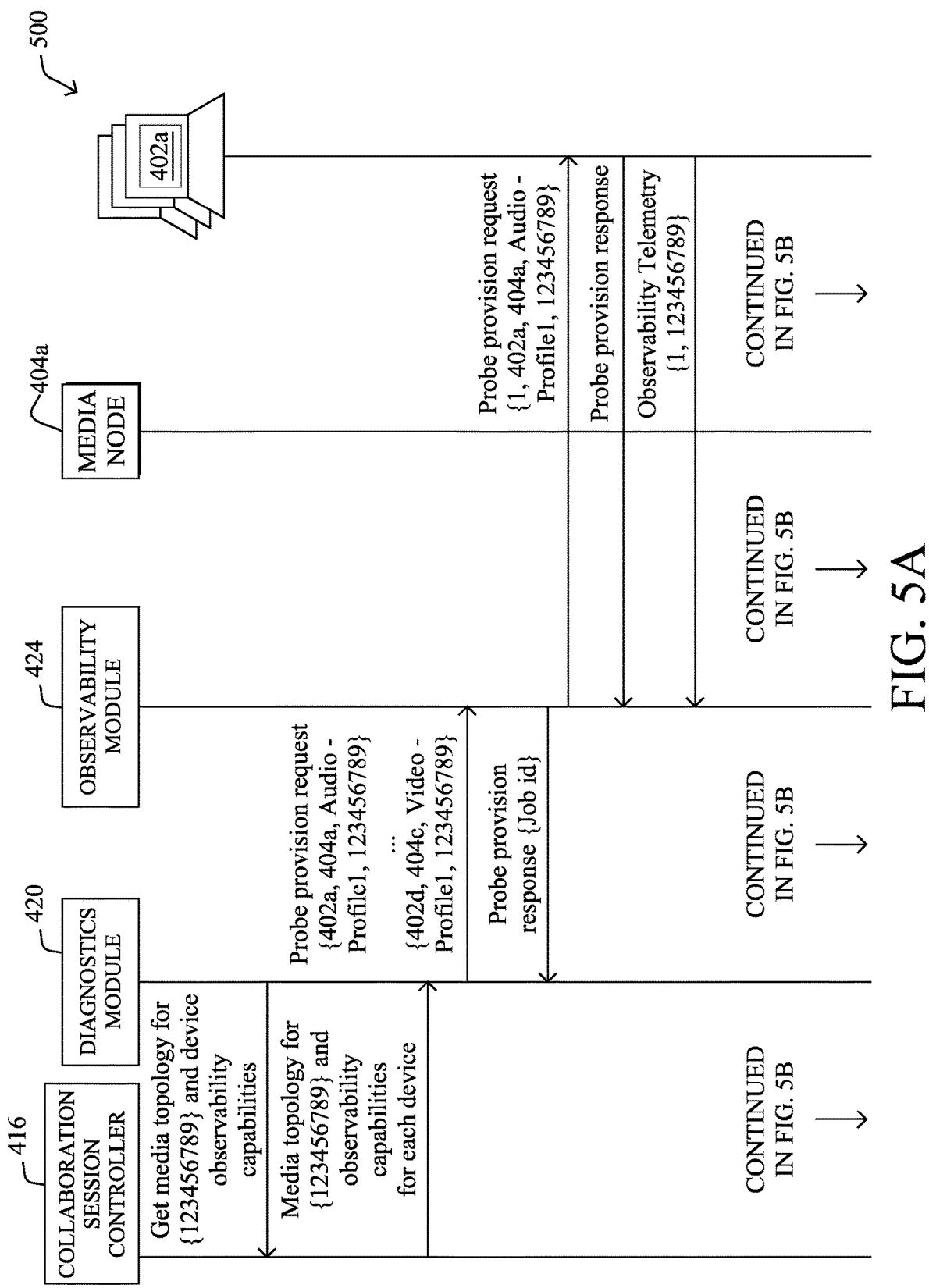
FIGS. 5A-5B illustrate an example data flow for testing media topologies of collaboration sessions.
Figure 5B:
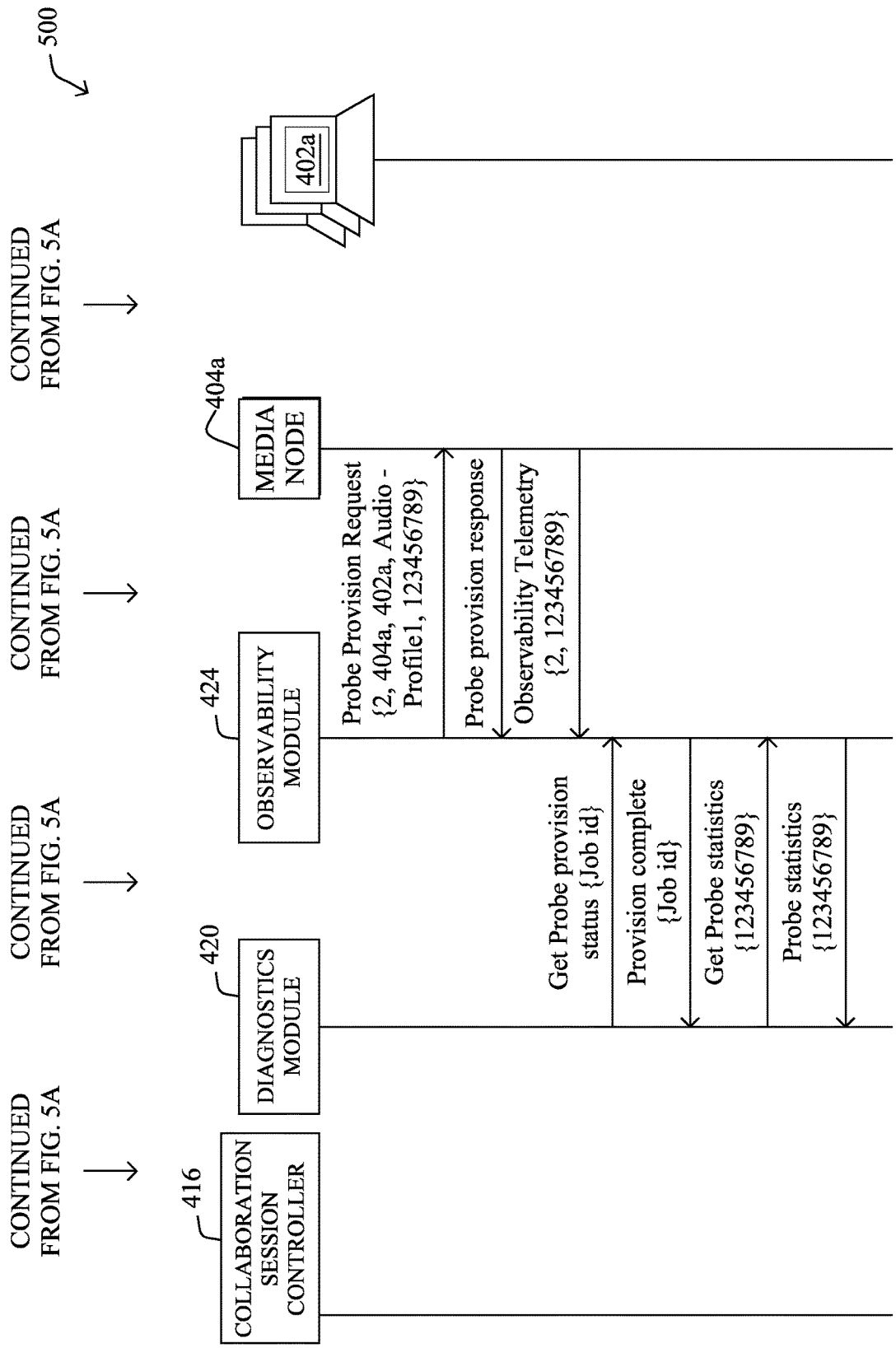

FIGS. 5A-5B illustrate an example data flow 500 for testing media topologies of collaboration sessions, according to various embodiments. Data flow 500 may occur between a collaboration session controller 416, diagnostics module 420, observability module 424, media node 404a, and/or a client device 402a as illustrated in FIG. 4.

Data flow 500 may begin with diagnostics module 420 obtaining a media topology for a collaboration session. Data flow 500 may be triggered by network telemetry data meeting or exceeding an impairment threshold for the collaboration session and/or by customer reports of technical problems.

Diagnostics module 420 may get the media topology from collaboration session controller 416. The media topology may include device observability capabilities for each of the nodes identified in the media topology. Again, the media topology is a media topology of a specific collaboration session identified by a specific collaboration session identifier (e.g., collaboration session identifier "123 456 789"). Diagnostics module 420 may request the media topology for this specific collaboration session using the specific collaboration session identifier.

Collaboration session controller 416 may provide the media topology and observability capabilities for each node participating in the collaboration session to the diagnostics module 420. For example, collaboration session controller 416 may provide the media topology and observability capabilities back to diagnostics module 420 in response to the previously mentioned request from diagnostic module 420 for the same.

Diagnostics module 420 may generate a probe provisioning request based on the media topology and the observability capabilities provided by the collaboration session is controller 416. For example, diagnostics module 420 may generate a bulk provisioning request that lists each probe that will be provisioned to test various corresponding segments of the media topology.

The probe provisioning request may list a source node in the media topology, a destination node in the media topology, a traffic profile of a test probe, and/or a collaboration session identifier for the collaboration session for which the data flow 500 is being performed. These attributes may be identified from the media topology and observability capabilities for the media topology as obtained from collaboration session controller 416. For example, a probe provisioning request may request an audio type test probe to be provisioned with a source node of client device 402a and a destination node of media node 404a in association with collaboration session identifier "123456789," a video type test probe to be provisioned with a source node of client device 402*d* and a destination node of media node 404*c* in association with collaboration session identifier "123456789," etc.

The probe provisioning request may be sent from diagnostics module 420 to observability module 424. Observability module 424 may accept the request and assign a job identifier to the probe provisioning request. Observability module 424 may send a probe provisioning response back to diagnostics module 420. The probe provisioning response may report the job identifier for the probe provisioning request to the diagnostics module 420. After receiving the job identifier from observability module 424, diagnostics module 420 may poll observability module 424 regarding the status of the probe provisioning request using the job identifier. The observability module 424 may also automatically inform diagnostics module 420 (e.g., though webhooks) that the probe provisioning task is complete.

Observability module 424 may assign a probe identifier to each of the probes being requested within the probe provision request and associate them to the collaboration session identifier. Observability module 424 may send each of the probe provisioning requests aggregated within the bulk probe provisioning request it received is from diagnostics module 420 to their respective media node, client device, etc. Each probe provisioning request may specify a probe identifier, a source node, a destination node, a traffic profile of a test probe, and/or a collaboration session identifier for the probe it is requesting to be provisioned.

For example, observability module 424 may send a probe provisioning request to client device 402*a* to provision an audio-type probe, associated with collaboration session identifier "123456789" and a probe identifier of "1," to test its connection to media node 404*a*. In some examples, an observability agent on a media node or client device where the probe is supposed to be provisioned may receive the request and cause the media node or client device to perform the probe test specified in the probe provisioning request.

Upon receiving the request, provisioning the requested test probe, and/or performing the requested test probing of a segment of the media topology, client device 402*a* and/or an observability agent executing thereupon may send a probe provision response back to observability module 424. The response may acknowledge the probe provision request and/or provide confirmation that the provisioning and testing will be completed, is underway, and/or is completed. The information in this response may be used by observability module 424 to provide any status updates on the probe provisioning request that may be requested by diagnostics module 420.

In addition, client device 402*a* and/or its observability agent may provide the probe test results that it collects from performing the requested probe test back to observability module 424. For example, client device 402*a* may provide observability telemetry data collected during the probing test between client device 402*a* and media node 404*a*. The observability telemetry data may be tagged with the probe identifier and/or collaboration session identifier associated with the probe test. For example, the observability telemetry data may be tagged with a probe identifier of "F" and a collaboration session identifier "123456789."

In another example, observability module 424 may send a probe provisioning request to media node 404*a* to provision an audio-type probe, associated with collaboration session identifier "123456789" and a probe identifier of "2," to test its connection to client device 402*a*. Media node 404*a* and/or an observability agent executing thereupon may send its probe provision response back to observability module 424 and/or cause the media node 404*a* to perform the probe test specified in the probe provisioning request.

Media node 404*a* and/or its observability agent may provide the probe test results that it collects from performing the requested probe test between media node 404*a* and a target device, which may be a client device 402*a* and/or another media node 404, back to observability module 424. The observability telemetry data may be tagged with the probe identifier and/or collaboration session identifier associated with the probe test. For example, the observability telemetry data may be tagged with a probe identifier of "2" and a collaboration session identifier "123456789."

As previously described, diagnostics module 420 may poll observability module 424 for a status of a probe provisioning request. For example, diagnostics module 420 may send a probe provision status request including the job identifier previously assigned to the probe provisioning request it is polling by observability module 424. Observability module 424 may use the job identifier to identify the probe provisioning request whose status is being polled. Observability module 424 may send back a status update for the probe provisioning request. For example, the status update may include an indication of the completion status for the provisioning of each of the requested probes.

Diagnostics module 420 may request the probe test results from observability module 424. For example, diagnostics module 420 may send a request to observability module 424 for probe statistics (e.g., telemetry data) associated with the collaboration session identifier "123456789." Observability module 424 may aggregate the telemetry data from each of the probes that is tagged with that collaboration session identifier and provide those probe statistics to diagnostics module 420 in response to the request. The probe statistics may be used by diagnostics module 420 to develop an end-to-end diagnostic assessment of the media topology and/or to identify a segment of the media is topology that is a source of a technical problem.

As previously outlined, the example data flow 500 involves probe provisioning and statistics collection that are specific to a particular ongoing collaboration session (e.g., identified by a specific collaboration session identifier such as collaboration session identifier "123 456 789"). In various embodiments, once that particular collaboration session ends, then the probe test, probe statistics, and/or other data associated with the data flow may be cleared.

FIGS. 6A-6B illustrate example probe mappings for testing media topologies of collaboration sessions, according to various embodiments. The mappings may be examples of probe identifier-to-collaboration session identifier mappings generated by and/or maintained by an observability module.

For example, probe mapping 600 may be a mapping of each of the probes provisioned to media topology nodes for various collaboration sessions. Probe mapping 600 may include a list of probes provisioned to media topology nodes for various collaboration sessions. Each of the probes may be identified by the probe identifier assigned to the probe by the observability module, a source node, a destination node, a traffic profile for the test probe, and a collaboration session identifier. Of note, multiple collaboration session identifiers are associated with some of the probes (e.g., the probes associated with probe identifiers 3, 4, 9, and 10). This is because if the observability module receives a probe provision request for a segment of the media topology (e.g., a source node to destination node span) for a new collaboration session and that same segment of the media topology is already being probed by a probe for a different collaboration session (identified by a different collaboration session identifier), then the observability module may just associate the new collaboration session identifier to the existing probe instead of creating a new duplicative probe. For example, the probes identified by probe identifiers 3, 4, 9, and 10 are leveraged for troubleshooting technical problems in three different collaboration sessions (e.g., the collaboration session identified by collaboration session identifier "123 456 789," the collaboration session is identified by collaboration session identifier "123 456 790," and the collaboration session identified by collaboration session identifier "123 456 791").

Similarly, mapping 602 is a mapping of each of the probes provisioned for various collaboration sessions. Like mapping 600, mapping 602 includes some probes, identified by probe identifiers 15, 16, 21, and 22, that are leveraged for troubleshooting technical problems in three different collaboration sessions (e.g., the collaboration session identified by collaboration session identifier "123 456 789," the collaboration session identified by collaboration session identifier "123 456 790," and the collaboration session identified by collaboration session identifier "123 456 791"). While mapping 600 is a list of probes with audio traffic profiles, mapping 602 is a list of probes with video traffic profiles.

An observability module may rely on the probe identifier-to-collaboration session identifier mappings in mapping 600 and mapping 602 to provision probes at their source node with the appropriate attributes. Additionally, the observability module may use the data in mapping 600 and mapping 602 to identify the resulting telemetry data coming back from the test probes as belonging to a particular collaboration session.

Figure 7:
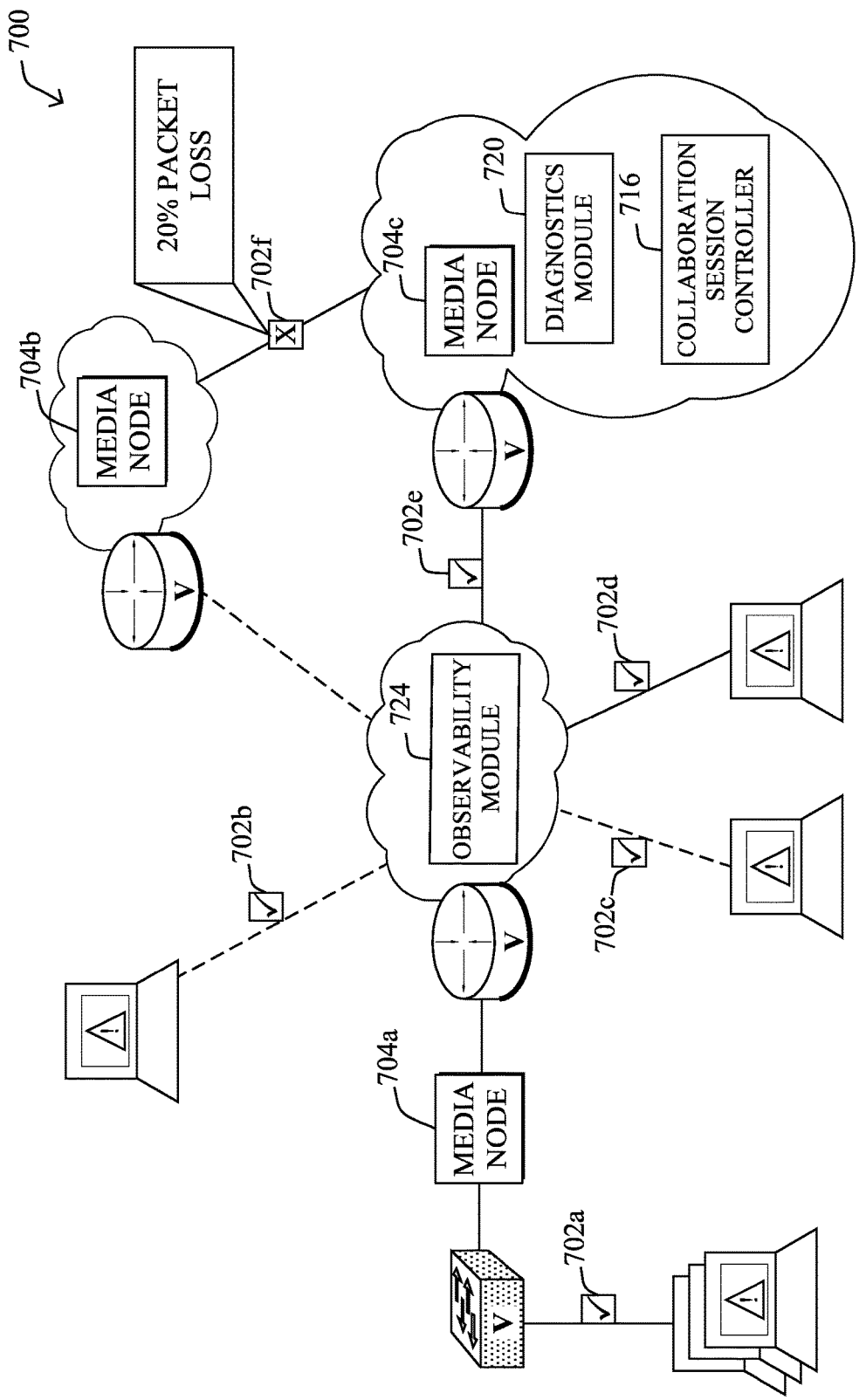
FIG. 7 illustrates an example troubleshooting view for testing media topologies of is collaboration sessions.

FIG. 7 illustrates an example troubleshooting view 700 for testing media topologies of collaboration sessions, according to various embodiments. The troubleshooting view 700 may be an end-to-end view showing the media topology of a live collaboration session augmented with per-hop performance insights 702.

For example, performance insights 702 may be indicated for each segment of the media topology. The performance insights 702 may be based on the telemetry data retrieved from each of the probe tests. For instance, a segment of the media topology between a source node and a destination node may be assigned a performance insight derived from a probe test conducted between that source node and that destination node for the collaboration session.

Performance insights 702 may be provided as part of an end-to-end view of each of the segments of the entire media topology for a collaboration session. This view may is be provided from the aggregated telemetry data from all the probes provisioned for a particular collaboration session. In this manner, a particular segment of the media topology that may be the source of a technical problem being experienced by participants of the collaboration session may be identified.

For example, the segments of the media topology where the telemetry data for the probes reveals network health and/or data communication metrics that are normal, expected, and/or that have not met or exceeded an impairment threshold may be unlikely to be the source of a technical problem. Therefore, these segments of the media topology for the collaboration session may be marked in the troubleshooting view 700 with a performance insight (e.g., performance insight 702a-702e) indicating that the segment is likely not the source of the technical problem. In some examples, these performance insights may include a symbol, color, telemetry data for that segment, statistical data derived from telemetry data for that segment, etc. indicating that the segment of the media topology, which may include the behavior of the source and destination nodes with respect to communicating over that segment, is operating within its expected parameters.

In contrast, some segments of the media topology where the telemetry data for the probes reveals network health and/or data communication metrics that are abnormal, unexpected, and/or have met or exceeded an impairment threshold may be likely sources of a technical problem. Therefore, a segment of the media topology for the collaboration session (e.g., a cascade link between media nodes, etc.) may be marked in the troubleshooting view 700 with a performance insight (e.g., performance insight 702O indicating that the segment is likely the source of the technical problem. In some examples, this performance insight may include a symbol, color, telemetry data for that segment, statistical data derived from telemetry data for that segment, etc. indicating that the segment of the media topology, which may include the behavior of the source and destination nodes with respect to communicating over that segment, is operating outside expected parameters.

A support engineer may utilize the troubleshooting view to identify the likely source of a technical problem for the collaboration session. For example, the support engineer may use the performance insights 702 to quickly isolate the technical problem to a specific segment within the media stream topology, troubleshoot that specific segment or the media nodes and/or client devices within the segment, and share root cause analysis with a customer.

Figure 8:
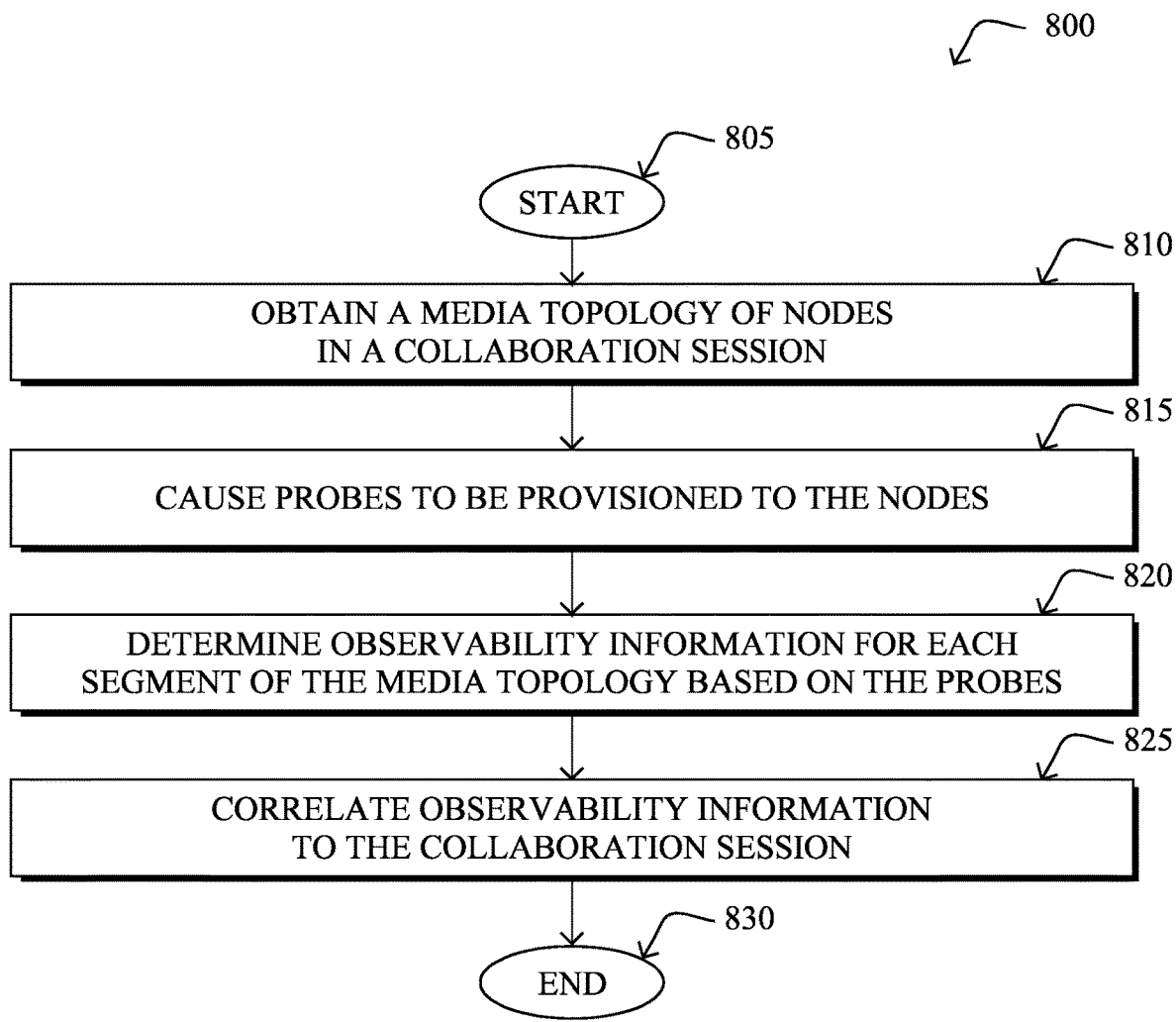
FIG. 8 illustrates an example simplified procedure for testing media topologies of collaboration sessions, in accordance with one or more embodiments described herein.

In closing, FIG. 8 illustrates an example simplified procedure for testing media topologies of collaboration sessions, according to various embodiments described herein. For example, a non-generic, specifically configured device (e.g., device 200) may perform procedure 800 by executing stored instructions (e.g., process 248, such as a testing process). The procedure 800 may start at step 805, and continues to step 810, where, as described in greater detail above, a device may obtain a media topology of nodes involved in a collaboration session. The nodes involved in the collaboration session may be end nodes, media nodes, servers, databases, edge nodes, and/or combinations thereof. The media topology may include media stream types for the collaboration session and/or an indication of whether each of the nodes involved in the collaboration session has an agent capable of testing a segment of the media topology. The media topology may indicate one or more cascade links between media nodes involved in the collaboration session.

At step 815, as detailed above, the device may cause each of a plurality of probes to be provisioned to a corresponding node of the nodes involved in the collaboration session. Each of the probes may be provisioned to perform a test of a corresponding segment of the media topology. Each of the probes may be associated to a session identifier of the collaboration session. Each of the probes may be assigned to its corresponding node based on the media topology and the media stream types. Each of the plurality of probes may be provisioned according to a probe provisioning request specifying a source, a destination, and a traffic profile of that probe. Each of the plurality of probes may be provisioned to an agent of the corresponding node to perform the test of the corresponding segment. A portion of the media topology segments being tested may is be cascade segments between media nodes.

Each of the plurality of probes may be caused to be provisioned in response to telemetry data received from the nodes exceeding an impairment threshold for the collaboration session. Additionally, or alternatively, each of the plurality of probes may be caused to be provisioned in response to a customer issue report for the collaboration session.

At step 820, as detailed above, the device may determine observability information based on results of the plurality of probes for each segment of the media topology. The results may include an indication of the session identifier associated to the probe. Notably, each of the plurality of probes can be associated with one or more session identifier. For example, procedure 800 may include determining that an existing probe associated to another session identifier corresponds to a segment of the media topology involved in the collaboration session and/or associating the session identifier of the collaboration session to the existing probe.

At step 825, as detailed above, the device may correlate the observability information to the collaboration session based on the indication of the session identifier. The observability information may be an aggregation of the results of a portion of the plurality of probes including an indication of a same session identifier.

The simplified procedure 800 may then end in step 825, notably with the ability to continue performing additional iterations of testing media topology and/or refining probe results. Other steps may also be included generally within procedure 800. For example, such steps (or, more generally, such additions to steps already specifically illustrated above), may include associating each probe provisioning request with a job identifier; and checking a status of the probe provisioning request using the job identifier. Further, such steps may include detecting, based on the observability information, a problem in a particular segment of the media topology. Furthermore, such steps may include generating a visual end-to-end illustration of the media topology of the nodes involved in the collaboration session along with the observability information for each segment of the is media topology; and so on.

The techniques described herein, therefore, provide for testing media topologies of collaboration sessions. In particular, the techniques herein address a long-standing difficulty in the collaboration industry of not being able to quickly and accurately isolate and narrow down the source of media quality issues caused by network impairments across the customer network, internet, SaaS provider network, etc. By implementing an automated mechanism for discovering the media topology, provisioning application specific probe/test cases, and correlating the test results using collaboration session identifiers, an end-to-end view of performance statistics for a collaboration session may be generated to inform troubleshooting efforts. The holistic yet focused insight provided by these techniques moves beyond the limitation of post-hoc log analysis and allows analysis across client devices, media nodes, cascade links, etc. involved in a specific and/or ongoing collaboration session. While these techniques provide precision collaboration session-specific troubleshooting abilities, they also provide the intelligence for the efficient use of probes (e.g., same probe used across multiple collaboration sessions) across multiple collaboration sessions such that both high granularity and high efficiency troubleshooting is achieved.

Illustratively, the techniques described herein may be performed by hardware, software, and/or firmware, such as in accordance with the illustrative testing process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, media nodes, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: obtaining, by a device, a media topology of nodes involved in a collaboration session; causing, by the device, each of a plurality of probes to be provisioned to a is corresponding node of the nodes involved in the collaboration session to perform a test of a corresponding segment of the media topology, wherein each of the plurality of probes is associated to a session identifier of the collaboration session; determining, by the device, observability information based on results of the plurality of probes for each segment of the media topology, wherein the results include an indication of the session identifier; and correlating, by the device, the observability information to the collaboration session based on the indication of the session identifier.

In one embodiment, the nodes involved in the collaboration session comprise at least one of end nodes, media nodes, servers, databases, and combinations thereof. In one embodiment, the media topology includes media stream types for the collaboration session and wherein each of the plurality of probes is assigned to its corresponding node based on the media topology and the media stream types. In one embodiment, the media topology includes an indication of whether each of the nodes involved in the collaboration session has an agent capable of testing a segment of the media topology. In one embodiment, causing each of the plurality of probes to be provisioned to the corresponding node of the nodes involved in the collaboration session to perform a test of the corresponding segment of the media topology includes causing each of the plurality of probes to be provisioned to an agent of the corresponding node to perform the test of the corresponding segment. In one embodiment, each of the plurality of probes is provisioned according to a probe provisioning request specifying a source, a destination, and a traffic profile of that probe.

In one embodiment, the method further comprises associating, by the device, each probe provisioning request with a job identifier, and checking, by the device, a status of the probe provisioning request using the job identifier. In one embodiment, the observability information is an aggregation of the results of a portion of the plurality of probes including an indication of a same session identifier. In one embodiment, the method further comprises detecting, based on the observability information, a problem in a particular segment of the media topology. In one embodiment, the method further comprises generating, by the device, a visual end-to-end illustration of the media is topology of the nodes involved in the collaboration session along with the observability information for each segment of the media topology. In one embodiment, the media topology indicates one or more cascade links between media nodes involved in the collaboration session. In one embodiment, each of the plurality of probes is caused to be provisioned in response to one or more of telemetry data received from the nodes exceeding an impairment threshold and a customer issue report for the collaboration session. In one embodiment, each of the plurality of probes can be associated with one or more session identifier. In one embodiment, the method further comprises determining that an existing probe associated to another session identifier corresponds to a segment of the media topology involved in the collaboration session and associating the session identifier of the collaboration session to the existing probe.

According to the embodiments herein, an illustrative tangible, non-transitory, computer-readable medium herein may have computer-executable instructions stored thereon that, when executed by a processor on a computer, may cause the computer to perform a method comprising: obtaining a media topology of nodes involved in a collaboration session; causing each of a plurality of probes to be provisioned to a corresponding node of the nodes involved in the collaboration session to perform a test of a corresponding segment of the media topology, wherein each of the plurality of probes is associated to a session identifier of the collaboration session; determining observability information based on results of the plurality of probes for each segment of the media topology, wherein the results include an indication of the session identifier; and correlating the observability information to the collaboration session based on the indication of the session identifier.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: obtain a media topology of nodes involved in a collaboration session; cause each of a plurality of probes to be provisioned to a is corresponding node of the nodes involved in the collaboration session to perform a test of a corresponding segment of the media topology, wherein each of the plurality of probes is associated to a session identifier of the collaboration session; determine observability information based on results of the plurality of probes for each segment of the media topology, wherein the results include an indication of the session identifier; and correlate the observability information to the collaboration session based on the indication of the session identifier.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be is described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server," "by a controller," "by an observability module," "by a diagnostics module," "by a media node," "by a client device," and so on, those skilled in the art will appreciate that agents of the collaboration session media topology testing platform (e.g., application agents, network agents, node agents, endpoint agents, enterprise agents, cloud agents, etc.) may be considered to be extensions of the server (or controller/module) operation, and as such, any process step performed "by a server" need not be limited to local processing on a specific server device, unless otherwise specifically noted as such. Furthermore, while certain aspects are described as being performed "by an agent" or by particular types of agents, the techniques may be generally applied to any suitable software/hardware configuration (libraries, engines, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on is a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
making, by a device, a determination that telemetry data received from a node of nodes involved in a collaboration session exceed an impairment threshold or that a customer issue report for the collaboration session has been obtained;
obtaining, by the device and in response to the determination, a media topology of the nodes involved in the collaboration session;
causing, by the device, each of a plurality of probes to be provisioned to a corresponding node of the nodes involved in the collaboration session to perform a test of a corresponding segment of the media topology, wherein the plurality of probes include an audio type test probe or a video type test probe that is selected based on the media topology, further wherein each of the plurality of probes is associated to a session identifier of the collaboration session;

determining, by the device, observability information based on results of the plurality of probes for each segment of the media topology, wherein the results include an indication of the session identifier; and correlating, by the device, the observability information to the collaboration session based on the indication of the session identifier.

2. The method as in claim 1, wherein the nodes involved in the collaboration session comprise at least one of end nodes, media nodes, servers, databases, and combinations thereof.

3. The method as in claim 1, wherein the media topology includes media stream types for the collaboration session and wherein each of the plurality of probes is assigned to its corresponding node based on the media topology and the media stream types.

4. The method as in claim 1, wherein the media topology includes an indication of whether each of the nodes involved in the collaboration session has an agent capable of testing a segment of the media topology.

5. The method as in claim 1, wherein causing each of the plurality of probes to be provisioned to the corresponding node of the nodes involved in the collaboration session to perform a test of the corresponding segment of the media topology includes causing each of the plurality of probes to be provisioned to an agent of the corresponding node to perform the test of the corresponding segment.

6. The method as in claim 1, wherein each of the plurality of probes is provisioned according to a probe provisioning request specifying a source, a destination, and a traffic profile of that probe.

7. The method as in claim 6, further comprising:
associating, by the device, each probe provisioning request with a job identifier; and
checking, by the device, a status of the probe provisioning request using the job identifier.

8. The method as in claim 1, wherein the observability information is an aggregation of the results of a portion of the plurality of probes including an indication of a same session identifier.

9. The method as in claim 1, further comprising:
detecting, based on the observability information, a problem in a particular segment of the media topology.

10. The method as in claim 1, further comprising:
generating, by the device, a visual end-to-end illustration of the media topology of the nodes involved in the collaboration session along with the observability information for each segment of the media topology.

11. The method as in claim 1, wherein the media topology indicates one or more cascade links between media nodes involved in the collaboration session.

12. The method as in claim 1, wherein each of the plurality of probes can be associated with one or more session identifier.

13. The method as in claim 1, further comprising:
determining that an existing probe associated to another session identifier corresponds to a segment of the media topology involved in the collaboration session; and
associating the session identifier of the collaboration session to the existing probe.

14. A tangible, non-transitory, computer-readable medium having computer-executable instructions stored thereon that, when executed by a processor on a computer, cause the computer to perform a method comprising:
making a determination that telemetry data received from a node of nodes involved in a collaboration session exceed an impairment threshold or that a customer issue report for the collaboration session has been obtained;
obtaining, in response to the determination, a media topology of the nodes involved in the collaboration session;
causing each of a plurality of probes to be provisioned to a corresponding node of the nodes involved in the collaboration session to perform a test of a corresponding segment of the media topology, wherein the plurality of probes include an audio type test probe or a video type test probe that is selected based on the media topology, further wherein each of the plurality of probes is associated to a session identifier of the collaboration session;
determining observability information based on results of the plurality of probes for each segment of the media topology, wherein the results include an indication of the session identifier; and
correlating the observability information to the collaboration session based on the indication of the session identifier.

15. The tangible, non-transitory, computer-readable medium as in claim 14, the method further comprising:
determining that an existing probe associated to another session identifier corresponds to a segment of the media topology involved in the collaboration session; and
associating the session identifier of the collaboration session to the existing probe.

16. The tangible, non-transitory, computer-readable medium as in claim 14, wherein the observability information is an aggregation of the results of a portion of the plurality of probes including an indication of a same session identifier.

17. The tangible, non-transitory, computer-readable medium as in claim 14, the method further comprising:
detecting, based on the observability information, a problem in a particular segment of the media topology.

18. The tangible, non-transitory, computer-readable medium as in claim 14, wherein the media topology indicates one or more cascade links between media nodes involved in the collaboration session.

19. An apparatus, comprising:
one or more network interfaces to communicate with a network;
a processor coupled to the one or more network interfaces and configured to execute one or more processes; and
a memory configured to store a process that is executable by the processor, the process, when executed, configured to:
make a determination that telemetry data received from a node of nodes involved in a collaboration session exceed an impairment threshold or that a customer issue report for the collaboration session has been obtained;
obtain, in response to the determination, a media topology of the nodes involved in the collaboration session;
cause each of a plurality of probes to be provisioned to a corresponding node of the nodes involved in the collaboration session to perform a test of a corresponding segment of the media topology, wherein the plurality of probes include an audio type test probe or a video type test probe that is selected based on the media topology, further wherein each of the plurality of probes is associated to a session identifier of the collaboration session;

determine observability information based on results of the plurality of probes for each segment of the media topology, wherein the results include an indication of the session identifier; and correlate the observability information to the collaboration session based on the indication of the session identifier.

* * * * *